United States Patent
Haynes et al.

(10) Patent No.: US 10,457,407 B2
(45) Date of Patent: Oct. 29, 2019

(54) DUAL CONFIGURATION WIND CURTAIN FOR EVACUATION ASSEMBLY

(71) Applicant: GOODRICH CORPORATION, Charlotte, NC (US)

(72) Inventors: Timothy C. Haynes, Prescott Valley, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 371 days.

(21) Appl. No.: 15/466,550

(22) Filed: Mar. 22, 2017

(65) Prior Publication Data
US 2018/0273191 A1   Sep. 27, 2018

(51) Int. Cl.
*B64D 25/14*   (2006.01)

(52) U.S. Cl.
CPC ................. *B64D 25/14* (2013.01)

(58) Field of Classification Search
CPC ........ B63C 2009/042; B63C 2009/044; B64D 25/14
See application file for complete search history.

(56) References Cited

U.S. PATENT DOCUMENTS

| | | | |
|---|---|---|---|
| 2,804,633 A | 9/1957 | Taylor et al. | |
| 3,827,094 A * | 8/1974 | Fisher | A62B 1/20 441/38 |
| 3,833,088 A * | 9/1974 | Chacko | B64D 25/14 182/48 |
| 3,860,984 A | 1/1975 | Fisher | |
| 4,332,049 A * | 6/1982 | Fisher | A62B 1/20 169/48 |
| 4,519,782 A * | 5/1985 | Fisher | A62B 1/20 182/48 |
| 5,733,158 A | 3/1998 | Higginbotham et al. | |
| 5,921,831 A | 7/1999 | Schulze | |
| 6,536,715 B1 * | 3/2003 | Moran | B64D 25/14 182/48 |
| 9,162,735 B2 | 10/2015 | Grainger | |

OTHER PUBLICATIONS

European Patent Office, European Search Report dated Apr. 3, 2018 in Application No. 18155749.7-1010.

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

An evacuation assembly of an aircraft includes an evacuation slide and a sheet coupled to the evacuation slide. The sheet may be deployable in a wind curtain configuration and a canopy configuration. In the wind curtain configuration, the sheet may extend, as a substantially vertical panel, longitudinally along opposing lateral sides of the evacuation slide. In the canopy configuration the sheet may extend over at least a portion of a top side of the evacuation slide. In the canopy configuration, the sheet may include a first portion that is the substantially vertical panel that extends longitudinally along the opposing lateral sides of the evacuation slide and a second portion that extends over the top side of the evacuation slide. The second portion of the curtain may in a furled, collapsed form in the wind curtain configuration and may be configured to unfurl in the canopy configuration.

15 Claims, 5 Drawing Sheets

DUAL CONFIGURATION WIND CURTAIN FOR EVACUATION ASSEMBLY

FIELD

The present disclosure relates to aircraft evacuation assemblies, and more specifically to evacuation slides.

BACKGROUND

An evacuation slide assembly may include an inflatable slide that helps passengers disembark from an aircraft in the event of an emergency or other evacuation event. The slides may deploy from a door sill or a side of the aircraft fuselage. Aircraft evacuation slides may also be utilized as passenger rafts in the event of a water landing.

SUMMARY

Disclosed herein, according to various embodiments, is an evacuation assembly of an aircraft. The evacuation assembly includes, according to various embodiments, an evacuation slide and a sheet coupled to the evacuation slide. The sheet may be deployable in a wind curtain configuration and a canopy configuration. In the wind curtain configuration the sheet may extend, as a substantially vertical panel, longitudinally along opposing lateral sides of the evacuation slide. In the canopy configuration the sheet may extend over at least a portion of a top side of the evacuation slide.

In various embodiments, in the canopy configuration the sheet includes a first portion that is the substantially vertical panel that extends longitudinally along the opposing lateral sides of the evacuation slide and a second portion that extends over the top side of the evacuation slide. In the wind curtain configuration, the second portion is in a furled form, wherein the second portion is configured to unfurl in the canopy configuration, according to various embodiments. In the wind curtain configuration the furled form of the second portion of the sheet may be disposed along only one of the opposing lateral sides of the evacuation slide, wherein in the canopy configuration the second portion is unfurled to extend over the top side of the evacuation slide to the other of the opposing lateral sides of the evacuation slide.

In various embodiments, in the wind curtain configuration the furled form of the second portion of the sheet extends along a top edge of the first portion of the sheet that is the substantially vertical panel. In various embodiments, in the wind curtain configuration the furled form of the second portion of the sheet is housed within an enclosure. The second portion of the sheet may be unitary with the first portion of the sheet. In various embodiments, the second portion of the sheet is separate from the first portion of the sheet.

In various embodiments, the evacuation assembly further includes pillars extending substantially vertically from the opposing lateral sides of the evacuation slide. In the wind curtain configuration the sheet, as the substantially vertical panel, is coupled to the pillars, according to various embodiments. In the canopy configuration the sheet may be detached from the pillars as the substantially vertical panel and attached as a roof panel.

In various embodiments, the evacuation assembly includes a support. In such embodiments, in the canopy configuration the support is coupled to and extends between the top side of the evacuation slide and the sheet. The support may be disposed in a middle section between the opposing lateral sides of the evacuation slide. In various embodiments, in the canopy configuration the sheet is coupled to the support. In the wind curtain configuration, the sheet as the substantially vertical panel is configured to disrupt air flow over the top side of the evacuation slide to produce negative lift in response to air flowing across the evacuation slide in a width direction, wherein the width direction is perpendicular to a longitudinal axis of the evacuation slide.

Also disclosed herein, according to various embodiments, is an evacuation assembly of an aircraft that includes an evacuation slide and a sheet coupled to the evacuation slide. The sheet may include a first portion and a second portion and the sheet may be deployable in a wind curtain configuration and a canopy configuration. In the wind curtain configuration the first portion of the sheet extends, as a substantially vertical panel, longitudinally along opposing lateral sides of the evacuation slide and the second portion is in a furled form, according to various embodiments. In the canopy configuration, the first portion of the sheet remains as the substantially vertical panel extending longitudinally along the opposing lateral sides of the evacuation slide and the second portion of the sheet is unfurled to extend over the top side of the evacuation slide, according to various embodiments.

Also disclosed herein, according to various embodiments, is a method of using an evacuation assembly of an aircraft. The method includes, according to various embodiments, inflating an evacuation slide such that the evacuation slide is in slide mode. In the slide mode a sheet may be coupled to the evacuation slide in a wind curtain configuration. The method further includes detaching the evacuation slide from the aircraft such that the evacuation slide is in raft mode and configuring the sheet in a canopy configuration.

In various embodiments, configuring the sheet in the canopy configuration is performed in response to the evacuation slide being in the raft mode. In various embodiments, configuring the sheet in the canopy configuration is performed after detaching the evacuation slide from the aircraft. In various embodiments, in the wind curtain configuration a first portion of the sheet extends, as a substantially vertical panel, longitudinally along opposing lateral sides of the evacuation slide and a second portion of the sheet is in a furled form. In such embodiments, configuring the sheet in the canopy configuration includes unfurling the second portion of the sheet and extending the second portion of the sheet over a top side of the evacuation slide.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. Throughout the present disclosure, like reference numbers denote like elements. Accordingly, elements with like element numbering may be shown in the figures but may not be necessarily be repeated herein for the sake of clarity.

A first component that is "axially outward" of a second component means that a first component is positioned at a greater distance in either longitudinal direction away from the longitudinal center of the composite component along its longitudinal axis than the second component. A first component that is "axially inward" of a second component means that the first component is positioned closer to the longitudinal center of the composite component along its longitudinal axis than the second component.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
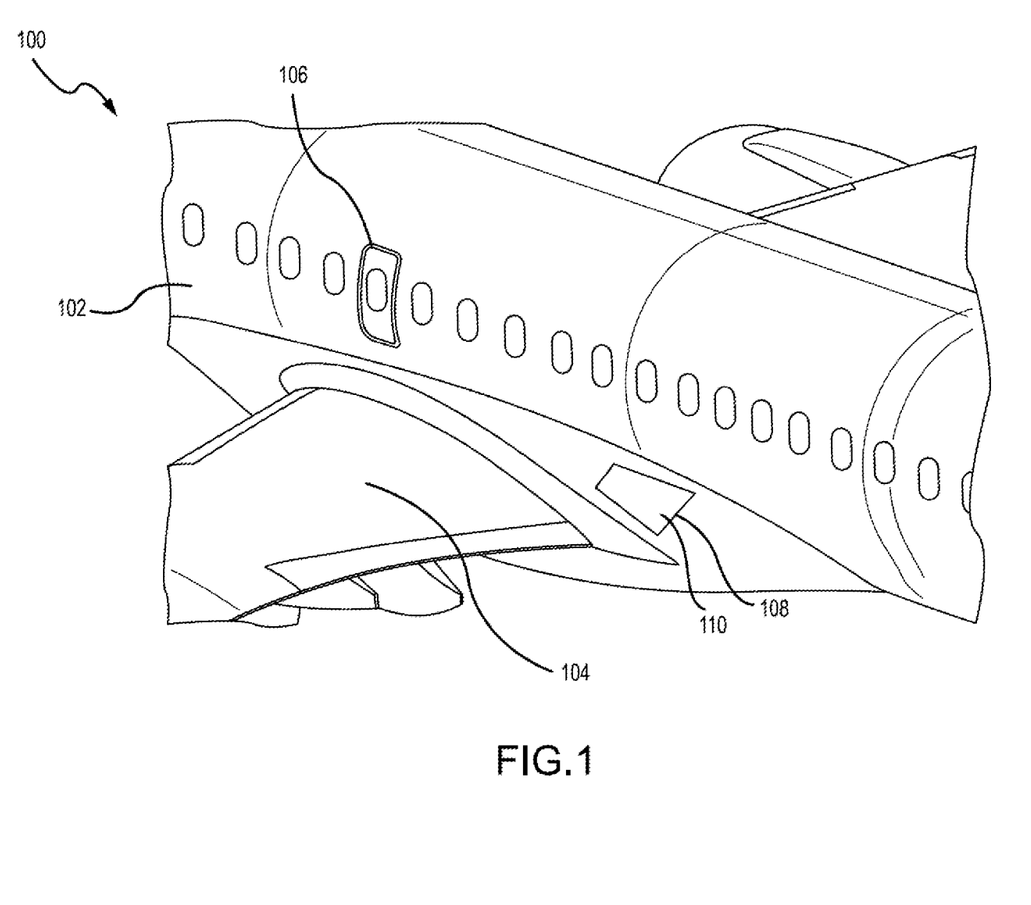
FIG. 1 illustrates a perspective view of an aircraft having an evacuation assembly, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation assembly 108 may be disposed aft of emergency exit door 106. Blowout panel 110 may cover evacuation assembly 108 when installed on the aircraft 100. In various embodiments, the evacuation assembly 108 may include and/or be housed within a packboard mounted to the aircraft 100.

The evacuation assembly 108 may jettison the blowout panel 110 and deploy an evacuation slide, such as an inflatable evacuation slide, in response to emergency exit door 106 opening or in response to another evacuation event. A common inopportune occurrence associated with conventional evacuation slides, is that when such slides are deployed in high lateral wind conditions, the wind may cause the slide to "kite" such that the toe end of the slide does not touch the ground, rendering the slide less usable. If the slide lifts off the ground above the airplane's door sill height after full extension, the slide may even block the aircraft exit and prevent safe evacuation of passengers and crew.

In the event of an emergency water landing, aircraft evacuation slides can also be used as passenger rafts. To protect passengers from the sun, rain, and/or other weather conditions while situated in the evacuation slide in raft mode, conventional evacuation assemblies have traditionally included a standalone canopy system that can be assembled, installed, and mounted to the evacuation slide after the evacuation slide is in raft mode.

Disclosed herein, according to various embodiments, is an evacuation assembly that can be arranged in two different configurations based on whether an evacuation slide of the evacuation assembly is in slide mode or in raft mode. Said differently, the evacuation assembly disclosed herein includes a sheet that is coupled to the evacuation slide that can be utilized in a wind curtain configuration to disrupt air flow over the top side of the evacuation slide to reduce or eliminate the "kiting" effect described above when the evacuation slide is in slide mode and that can also be utilized in a canopy configuration to protect passengers when the evacuation slide is in raft mode, in accordance with various embodiments.

Figure 2:
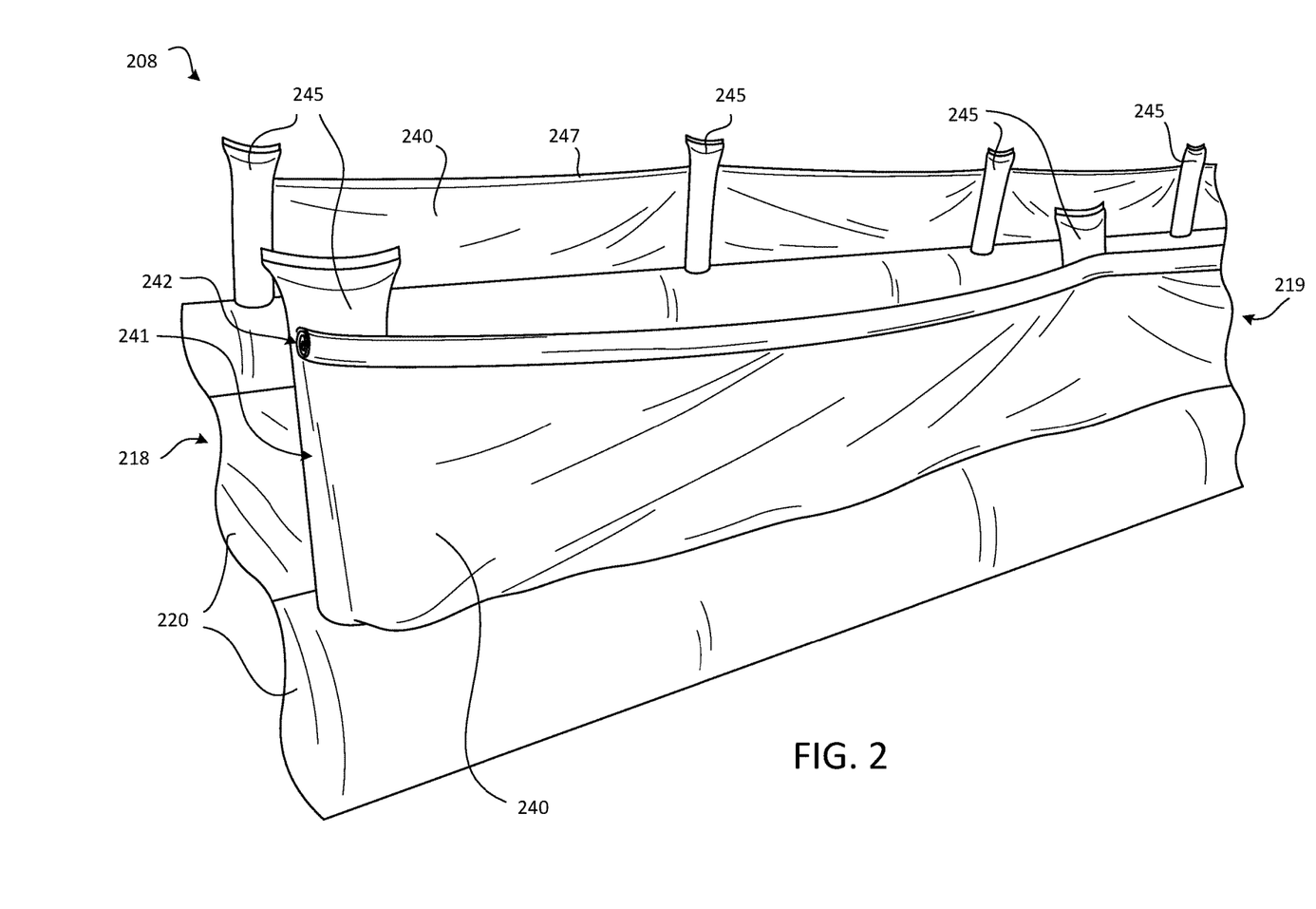
FIG. 2 illustrates a perspective view of an evacuation assembly with a sheet in a wind curtain configuration, in accordance with various embodiments.
Figure 3:
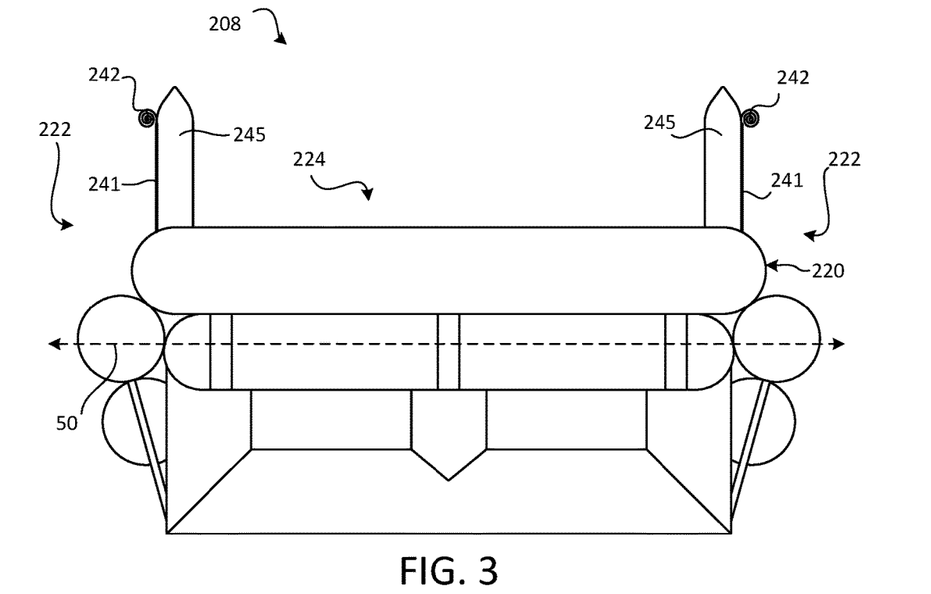
FIG. 3 illustrates a cross-sectional view of an evacuation assembly with a sheet in a wind curtain configuration, in accordance with various embodiments.

In various embodiments, and with reference to FIGS. 2 and 3, the evacuation assembly 208 includes an evacuation slide 220 and a sheet 240 coupled to the evacuation slide 220. The sheet 240 is deployable in a wind curtain configuration, with reference to FIGS. 2 and 3, and a canopy configuration, with reference to FIG. 5. In the wind curtain configuration (FIGS. 2 and 3), the sheet 240 extends, as a substantially vertical panel 241, longitudinally along opposing lateral sides 222 of the evacuation slide 220, according to various embodiments. As described in greater detail below, in the wind curtain configuration the sheet 240, disposed and positioned as the substantially vertical panel 241 protruding from the lateral sides 222 of the evacuation slide, disrupts the flow of air/wind over the top side of the evacuation slide 220 in a width direction 50, thereby creating negative lift that helps to hold a toe end 219 of the evacuation slide 220 against the ground or against the water when the evacuation slide 220 is in slide mode. The width direction 50 is substantially perpendicular to the longitudinal axis of the evacuation slide 220.

In the canopy configuration (FIG. 5, described in greater detail below), the sheet 240 extends over at least a portion of a top side 224 of the evacuation slide 220, according to various embodiments. Also, as described in greater detail below, with the sheet 240 disposed over the top side 224 of the evacuation slide 220, passengers situated in the evacuation slide 220 in the raft mode are protected by the sheet 240 from sun, precipitation, and/or other weather conditions. The sheet 240 may be made from a fabric material, a plastic material, or a composite material, among others. For example, the sheet may be made from the same material as the evacuation slide (e.g., nylon or nylon coated with a thermoplastic material, among others).

In various embodiments, and with reference to FIGS. 2 and 3, the configuration of the evacuation assembly 208 can be switched by a single user. For example, the evacuation slide 220 may inflate/deploy with the sheet 240 attached to the evacuation slide 220 in the wind curtain configuration. After the aircraft 100 has been evacuated, the evacuation slide 220 can be detached from the aircraft 100, as described in greater detail below with reference to FIG. 6, and the evacuation slide 220 can be converted to raft mode. In various embodiments, a single user can reconfigure the sheet 240 to extend over at least a portion of the top side 224 (FIG. 3) of the evacuation slide. Before describing the details pertaining to how the evacuation assembly 208 can be switched between the two configurations, it may be beneficial to first describe the features and structure of the two configurations.

With continued reference to FIGS. 2 and 3, in the wind curtain configuration the sheet 240 is arranged to form the substantially vertical panel 241 along opposing lateral sides 222 of the evacuation slide 220, according to various embodiments. In various embodiments, the evacuation slide 220 may include one or more pillars 245 extending substantially vertically from the lateral edges 222 of the evacuation slide 220. The sheet 240 may be coupled to the pillars 245 and the pillars 245 may thus provide structural support to help retain the sheet 240 in the wind curtain configuration (e.g., arranged as the substantially vertical panel 241).

In various embodiments, the sheet 240 extends substantially along the entire longitudinal length of the evacuation slide 220 (e.g., from a head end 218 to a toe end 219). In various embodiments, the sheet may not extend along the entire longitudinal length of the evacuation slide 220, but may only be disposed along a portion (e.g., the toe end 219).

In the wind curtain configuration, a first portion (e.g., 241) of the sheet 240 may form the substantial vertical panel 241 that extends longitudinally along the opposing lateral sides 222 of the evacuation slide 220. In various embodiments, the sheet 240 further includes a second portion (e.g., 242) that is in a furled form 242 (e.g., a collapsed, folded, rolled state) in the wind curtain configuration and that is configured to unfurl to form a roof panel 243 (FIG. 5) in the canopy configuration. That is, the sheet 240 may be a unitary material, with a first portion/section of the sheet 240 forming the substantially vertical panel 241 and a second portion capable of being compactly stored in the furled form 242 in the wind curtain configuration and extended in the roof panel 243 arrangement in the canopy configuration. In various embodiments, in the canopy configuration sheets in the furled forms 242 from each lateral side 222 may extend towards the middle section of the evacuation slide and may be coupled together to form the roof panel 243. In various embodiments, as described in greater detail below, the sheet may engage or may be directly coupled to a support 230 coupled to the top side 224 of the evacuation slide 220.

Figure 5:
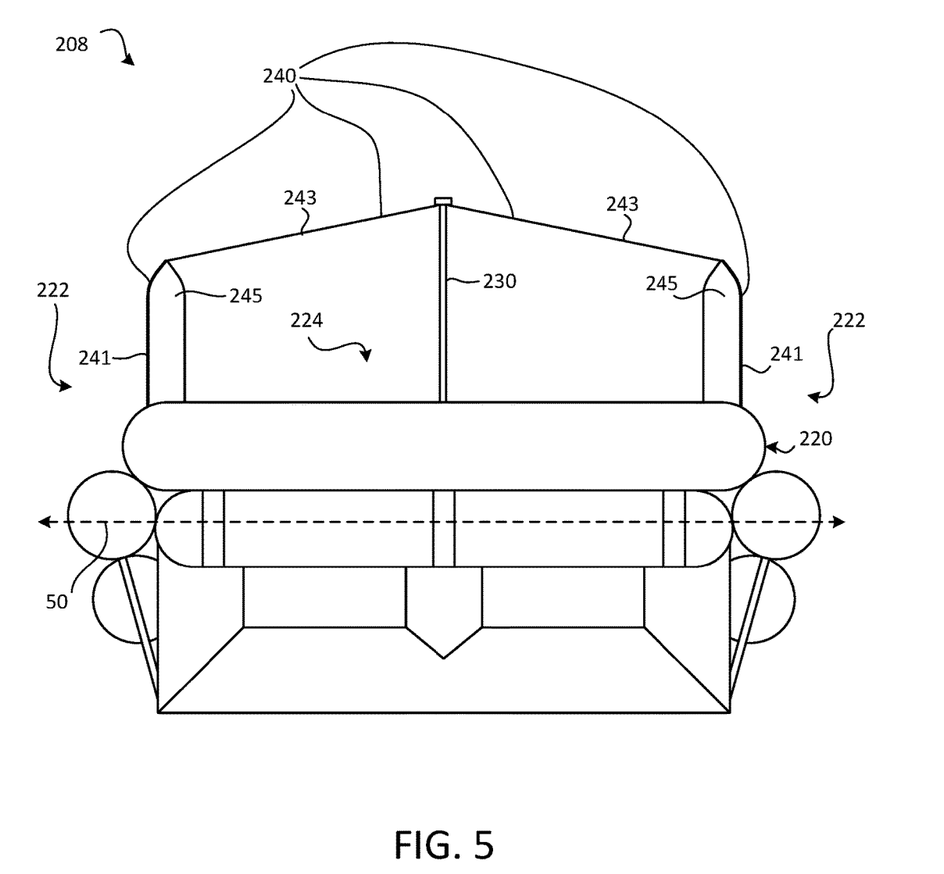
FIG. 5 illustrates a cross-sectional view of an evacuation assembly with a sheet in a canopy configuration, in accordance with various embodiments.

In various embodiments, the first and second portions of the sheet may be separate from each other (e.g., may be two different segments of material). In various embodiments, the substantially vertical panel 241 may be detached (or at least partially detached) from the evacuation slide and may be reconfigured to have the roof panel 243 arrangement in the canopy configuration. In such embodiments, there may be no wind curtain and instead the sheet may be reattached and/or folded over to extend over the top side 224 of the evacuation slide 220.

In various embodiments, the furled form 242 of the sheet 240 may be disposed along a top edge 247 (FIG. 2) of the substantially vertical panel 241. In various embodiments, and with reference to FIG. 4, the evacuation assembly 408 may be arranged so that the furled portion 442 is disposed along only one of the lateral sides 422B (not along 422A) of the evacuation slide 220. With a single furled portion 442, instead of two separate sheet sections being coupled together to form the roof panel 243, the sheet 240 from the single furled portion 442 extends across and over the top surface 224 of the evacuation slide 220 to form the roof panel 243, according to various embodiments.

Figure 4:
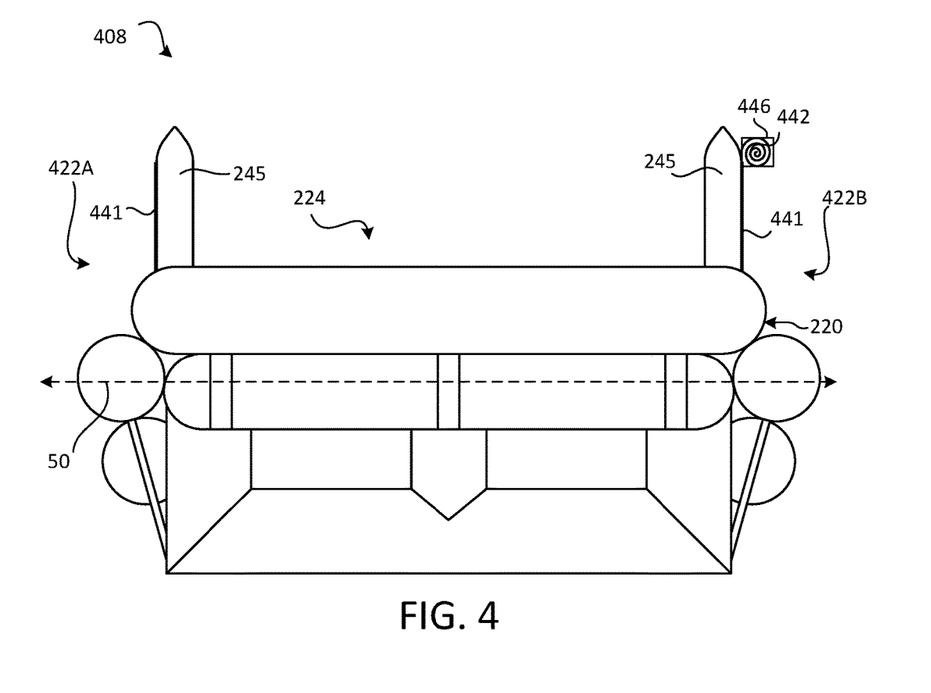
FIG. 4 illustrates a cross-sectional view of an evacuation assembly with a sheet in a wind curtain configuration, in accordance with various embodiments.

In various embodiments, and with continued reference to FIG. 4, the furled portion 442 may be housed or stored within an enclosure 446. The enclosure 446 may be easily opened by a single user to allow the sheet to be unfurled and extended. In various embodiments, the sheet may be maintained in the furled form by using various straps, fasteners, ties, or other suitable attachment structures. In various embodiments, both lateral sides 422A, 422B may have the substantially vertical panel 241 to disrupt the wind in the wind curtain configuration. In various embodiments, only one of the lateral sides may have the substantially vertical panel to disrupt the wind in the wind curtain configuration.

In the canopy configuration, and with reference to FIG. 5, the sheet 240 extends across and over the top side 224 of the evacuation slide 220, according to various embodiments. The evacuation assembly 208 may further include one or more supports 230 that are coupled to and extend between the top side 224 of the evacuation slide 220 and the sheet 240 in the canopy configuration. In various embodiments, the support 230 may include a pole, a tube, a divider, or other suitable device/structure. The support 230 may engage the sheet 240 to hold the sheet 240 a distance apart from the top side 224 of the evacuation slide 220. In various embodiments, as described in greater detail below, the sheet 240 may be directly coupled/attached to the support 230.

In various embodiments, the support 230 may be disposed in a middle section between the lateral sides 222 of the evacuation slide 220. In various embodiments, a plurality of supports may extend along the longitudinal length of the evacuation slide 220 in the middle section. For example, a first support and a second support may be disposed in the middle section but may be longitudinally spaced apart from each other. In various embodiments, the support is a continuous structure that extends substantially along the entire longitudinal length of the evacuation slide 220.

In various embodiments, the support 230 is permanently coupled to the evacuation slide 220. In various embodiments, however, the support 230 may be detachably coupled to the evacuation slide 220, thereby allowing a user to attach/detach the support 230 depending on which configuration (e.g., the wind curtain configuration with the slide in slide mode or the canopy configuration with the slide in raft mode).

Figure 6:
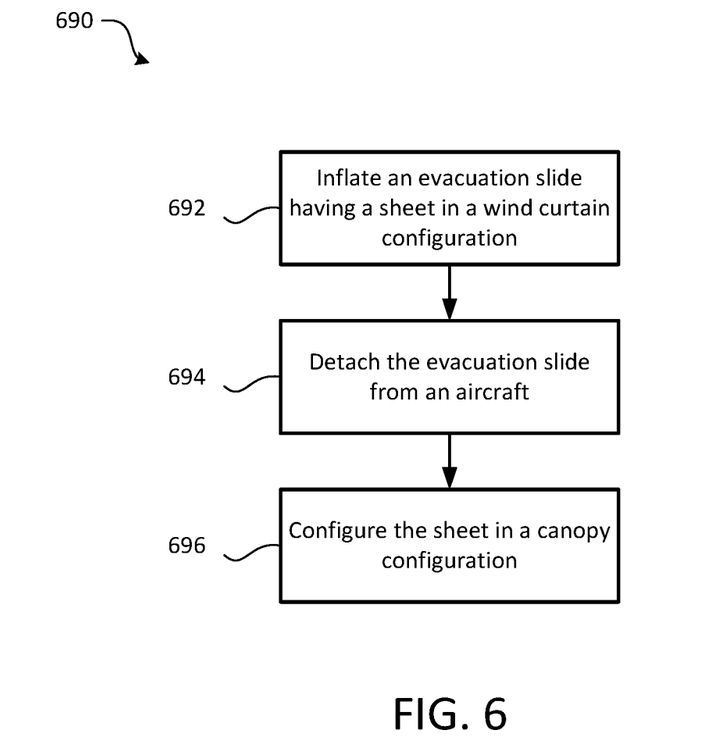
FIG. 6 is a schematic flow chart diagram of a method of using an evacuation assembly of an aircraft, in accordance with various embodiments.

In various embodiments, and with reference to FIG. 6, a method 690 of using an evacuation assembly of an aircraft is provided herein. The method 690 includes, according to various embodiments, inflating an evacuation slide having a sheet in the wind curtain configuration at step 692. That is, the evacuation slide may be inflated so as to be in slide mode to facilitate evacuation of passengers/crew. The method 690 further includes, according to various embodiments, detaching the evacuation slide from the aircraft at step 694. By detaching the evacuation slide from the aircraft, the evacuation slide may be in raft mode. The method 690 further includes, according to various embodiments, configuring the sheet in the canopy configuration at step 696. In various embodiments, step 696 may be performed in response to the evacuation slide being in raft mode (e.g., step 696 may be performed after step 694).

As mentioned above, configuring the sheet in the canopy configuration (step 696) may include unfurling a portion of the sheet and extending that portion of the sheet over a top side of the evacuation slide.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation assembly of an aircraft, the evacuation assembly comprising:
   an evacuation slide; and
   a sheet coupled to the evacuation slide, wherein the sheet is deployable in a wind curtain configuration and a canopy configuration, wherein the sheet comprises a first portion and a second portion;
   wherein in the wind curtain configuration:
      the first portion of the sheet is a substantially vertical panel that extends along one lateral side of two opposing lateral sides of the evacuation slide;
      the second portion of the sheet is in a furled form that extends along a top edge of the first portion of the sheet that is the substantially vertical panel at the lateral side of the evacuation slide;
   wherein in the canopy configuration:
      the second portion is unfurled to extend over a top side of the evacuation slide.

2. The evacuation assembly of claim 1, wherein in the wind curtain configuration the furled form of the second portion of the sheet is disposed along only the one lateral side of the two opposing lateral sides of the evacuation slide, wherein in the canopy configuration the second portion is unfurled to extend over the top side of the evacuation slide to the other of the two opposing lateral sides of the evacuation slide.

3. The evacuation assembly of claim 1, wherein in the wind curtain configuration the sheet as the substantially vertical panel is configured to disrupt air flow over the top side of the evacuation slide to produce negative lift in response to air flowing across the evacuation slide in a width direction, wherein the width direction is perpendicular to a longitudinal axis of the evacuation slide.

4. The evacuation assembly of claim 1, wherein in the wind curtain configuration the furled form of the second portion of the sheet is housed within an enclosure.

5. The evacuation assembly of claim 1, wherein the second portion of the sheet is unitary with the first portion of the sheet.

6. The evacuation assembly of claim 1, wherein the second portion of the sheet is separate from the first portion of the sheet.

7. The evacuation assembly of claim 1, further comprising pillars extending substantially vertically from the opposing lateral sides of the evacuation slide, wherein in the wind curtain configuration the sheet, as the substantially vertical panel, is coupled to the pillars.

8. The evacuation assembly of claim 7, wherein in the canopy configuration the sheet is detached from the pillars as the substantially vertical panel.

9. The evacuation assembly of claim 1, wherein:
   the evacuation assembly comprises a support; and
   in the canopy configuration, the support is coupled to and extends between the top side of the evacuation slide and the sheet.

10. The evacuation assembly of claim 9, wherein the support is disposed in a middle section between the two opposing lateral sides of the evacuation slide.

11. The evacuation assembly of claim 10, wherein in the canopy configuration the sheet is coupled to the support.

12. An evacuation assembly of an aircraft, the evacuation assembly comprising:
  an evacuation slide; and
  a sheet coupled to the evacuation slide, the sheet comprising a first portion and a second portion, wherein:
    the sheet is deployable in a wind curtain configuration and a canopy configuration;
    in the wind curtain configuration the first portion of the sheet extends, as a substantially vertical panel, longitudinally along opposing lateral sides of the evacuation slide and the second portion is in a furled form; and
    in the canopy configuration the first portion of the sheet remains as the substantially vertical panel extending longitudinally along the opposing lateral sides of the evacuation slide and the second portion of the sheet is unfurled from a top edge of the substantially vertical panel to extend over the top side of the evacuation slide.

13. A method of using an evacuation assembly of an aircraft, the method comprising:
  inflating an evacuation slide such that the evacuation slide is in slide mode, wherein in the slide mode a sheet is coupled to the evacuation slide in a wind curtain configuration;
  detaching the evacuation slide from the aircraft such that the evacuation slide is in raft mode; and
  configuring the sheet in a canopy configuration, wherein configuring the sheet in the canopy configuration comprises unfurling a second portion of the sheet from a top edge of a first portion of the sheet that forms a substantially vertical panel and extending the second portion of the sheet over a top side of the evacuation slide.

14. The method of claim 13, wherein configuring the sheet in the canopy configuration is performed in response to the evacuation slide being in the raft mode.

15. The method of claim 13, wherein configuring the sheet in the canopy configuration is performed after detaching the evacuation slide from the aircraft.

* * * * *